US008637185B2

(12) United States Patent
Berdichevsky et al.

(10) Patent No.: US 8,637,185 B2
(45) Date of Patent: Jan. 28, 2014

(54) OPEN STRUCTURES IN SUBSTRATES FOR ELECTRODES

(75) Inventors: Eugene M. Berdichevsky, Menlo Park, CA (US); Song Han, Foster City, CA (US); Yi Cui, Stanford, CA (US); Rainer J. Fasching, Mill Valley, CA (US); Ghyrn E. Loveness, Menlo Park, CA (US); William S. DelHagen, Menlo Park, CA (US); Mark C. Platshon, Menlo Park, CA (US)

(73) Assignee: Amprius, Inc., Sunnyvale, CA (US)

( * ) Notice: Subject to any disclaimer, the term of this patent is extended or adjusted under 35 U.S.C. 154(b) by 175 days.

(21) Appl. No.: 12/944,596

(22) Filed: Nov. 11, 2010

(65) Prior Publication Data

US 2011/0111296 A1 May 12, 2011

Related U.S. Application Data

(60) Provisional application No. 61/260,292, filed on Nov. 11, 2009.

(51) Int. Cl.
*H01M 4/38* (2006.01)

(52) U.S. Cl.
USPC ........................................ 429/218.1; 429/236

(58) Field of Classification Search
USPC .................. 429/218.1, 236, 241, 245; 427/78
See application file for complete search history.

(56) References Cited

U.S. PATENT DOCUMENTS

| 6,514,395 B2 | 2/2003 | Zhou et al. |
| 7,816,031 B2 | 10/2010 | Cui et al. |

| 2007/0248887 A1* | 10/2007 | Eskra et al. ................... 429/235 |
| 2008/0096110 A1 | 4/2008 | Bito et al. |
| 2009/0042102 A1 | 2/2009 | Cui et al. |
| 2009/0186267 A1 | 7/2009 | Tiegs |
| 2010/0136393 A1 | 6/2010 | Takezawa et al. |

(Continued)

FOREIGN PATENT DOCUMENTS

| KR | 2002-0059703 | 7/2002 |
| WO | 2009/129490 | 10/2009 |

OTHER PUBLICATIONS

U.S. Application entitled "Electrode Including Nanostructures for Rechargeable Cells", U.S. Appl. No. 12/437,529, filed May 7, 2009.

(Continued)

*Primary Examiner* — Mark F Huff
*Assistant Examiner* — Monique Wills
(74) *Attorney, Agent, or Firm* — Weaver Austin Villeneuve & Sampson LLP

(57) ABSTRACT

Provided are conductive substrates having open structures and fractional void volumes of at least about 25% or, more specifically, or at least about 50% for use in lithium ion batteries. Nanostructured active materials are deposited over such substrates to form battery electrodes. The fractional void volume may help to accommodate swelling of some active materials during cycling. In certain embodiments, overall outer dimensions of the electrode remain substantially the same during cycling, while internal open spaces of the conductive substrate provide space for any volumetric changes in the nanostructured active materials. In specific embodiments, a nanoscale layer of silicon is deposited over a metallic mesh to form a negative electrode. In another embodiment, a conductive substrate is a perforated sheet with multiple openings, such that a nanostructured active material is deposited into the openings but not on the external surfaces of the sheet.

26 Claims, 12 Drawing Sheets

(56) References Cited

U.S. PATENT DOCUMENTS

2010/0167112 A1    7/2010   Honda et al.
2010/0247990 A1    9/2010   Ugaji et al.
2010/0330423 A1*  12/2010   Cui et al. .................. 429/220
2011/0059362 A1*   3/2011   West et al. ................. 429/219
2011/0070488 A1*   3/2011   West et al. ................. 429/209

OTHER PUBLICATIONS

Kasavajjula, et al. Nano-and bulk-silicon-based insertion anodes for lithium-ion secondary cells. J. Power Sources 163, 1003-1039 (2007).

WO patent application No. PCT/US2010/056163, International Search Report and Written Opinion, mailed Jul. 20, 2011.

* cited by examiner

Drying / Solvent Removal

OPEN STRUCTURES IN SUBSTRATES FOR ELECTRODES

CROSS-REFERENCE TO RELATED APPLICATIONS

This application claims the benefit of U.S. Provisional Application No. 61/260,292, filed Nov. 11, 2009, entitled "OPEN STRUCTURES IN SUBSTRATES FOR ELECTRODES," which is incorporated herein by reference in its entirety for all purposes.

BACKGROUND

The demand for high capacity rechargeable batteries is strong. Many applications, such as aerospace, medical devices, portable electronics, and automotive, require high gravimetric and/or volumetric capacity cells. Lithium ion battery technology demonstrated significant promises in this regard. However, the lithium ion technology is primarily based on graphite electrodes, which have a theoretical capacity of only about 372 mAh/g.

Silicon is an attractive insertion material for lithium and other electrochemically active ions. The theoretical capacity of silicon in a lithium ion cell has been estimated at about 4200 mAh/g. Yet silicon and some other high capacity electrode materials have not been widely used or commercially implemented. One of the main reasons is the substantial change in volume that silicon undergoes during cycling. Silicon swells by as much as 400% when it is charged close to its theoretical capacity. Volume changes of this magnitude can cause substantial stresses in the negative electrode and other internal cell structures resulting in fractures and pulverization, loss of electrical connections within the electrode, and capacity fade of the battery. One approach to addressing this issue involves the use of silicon nanostructures (e.g., silicon nanowires) as the negative electrode active material in lithium batteries. See e.g., Chan, C. K., et al., *High-performance lithium battery anodes using silicon nanowires*, Nature, Vol. 3, January 2008. The inventors have recognized that conventional lithium ion cell designs that include negative current collecting substrates such as rolled metallic foils, with low surface roughness, do not allow silicon nanostructures to realize their potential as high capacity electrode materials for lithium ion cells. Overall, there is a need for improved battery cell designs that can accommodate high capacity active materials, particularly nanostructured materials, in battery electrodes and minimize the drawbacks described above.

SUMMARY

Provided are conductive substrates having open structures and fractional void volumes of at least about 25% or, more specifically, or at least about 50% for use in lithium ion batteries. Nanostructured active materials are deposited over such substrates to form battery electrodes. The fractional void volume may help to accommodate swelling of some active materials during cycling. In certain embodiments, overall outer dimensions of the electrode remain substantially the same during cycling, while internal open spaces of the conductive substrate provide space for any volumetric changes in the nanostructured active materials. In specific embodiments, a nanoscale layer of silicon is deposited over a metallic mesh to form a negative electrode. In another embodiment, a conductive substrate is a perforated sheet with multiple openings, such that a nanostructured active material is deposited into the openings but not on the external surfaces of the sheet.

In certain embodiments, a lithium ion battery electrode for use in lithium ion batteries includes a conductive substrate having open structures and a fractional void volume of at least about 25% and nanostructured active material formed on the conductive substrate, and in direct electronic communication therewith, for inserting and removing lithium ions during battery cycling. The nanostructured active material may include one or more of the following materials: silicon, germanium, and tin. The conductive substrate may be of one or more of the following type: a foam, a mesh, and a perforated sheet. A lithium ion battery electrode may be configured to maintain a substantially constant thickness during cycling of the lithium ion battery.

In certain embodiments, a conductive substrate is a perforated sheet having a top surface, a bottom surface, and multiple openings having inner surfaces. A nanostructured active material is deposited on the inner surfaces of the openings while the top surface and the bottom surface of the perforated sheet are substantially free from the nanostructured active material. The opening may have an average cross-section dimension of between about 10 micrometers and 100 micrometers.

In certain embodiments, a nanostructured active material includes nanowires. In other embodiments, the nanostructured active material includes substrate rooted nanostructures, nanoparticles, and/or nanolayers. A nanostructured active material may have a critical dimension of less than about 100 nanometers. In the same or other embodiments, an overall electrode may have a fractional density of at least about 50% prior to the first charge. A nanostructured active material may include amorphous silicon.

A conductive substrate may include randomly oriented open structures. For example, a conductive substrate may be an open cell foam. In certain embodiments, a conductive substrate has an electronic resistivity of less than about $6.4 \times 10^{-7}$ Ohm-cm. A conductive substrate may be configured to transport electrochemically active ions between two opposite surfaces of the electrode. Examples of a conductive substrate material include copper, stainless steel, nickel, and titanium. In certain embodiments, a conductive substrate has a surface area of at least 50% greater than the corresponding two surfaces of the electrode.

Provided also a method of manufacturing an electrode for use in a lithium ion battery. In certain embodiments, a method involves providing a conductive substrate having open structures and a fractional void volume at least about 25% and depositing a nanostructured active material that includes silicon, germanium, and/or tin on the conductive substrate. The deposited nanostructured active material is configured for inserting and removing lithium ions during battery cycling. Deposition may involve a vapor-liquid-solid chemical vapor deposition process to form crystalline silicon nanowires that are substrate rooted on the conductive substrate. In other embodiments, deposition involves introducing a slurry having a nanostructured active material into a conductive substrate and drying the slurry to form voids inside the electrode. Also provided is a lithium ion cell prepared in accordance with any of the foregoing techniques or electrode examples.

These and other aspects of the invention are described further below with reference to the figures.

DETAILED DESCRIPTION OF EXAMPLE EMBODIMENTS

Figure 1A:
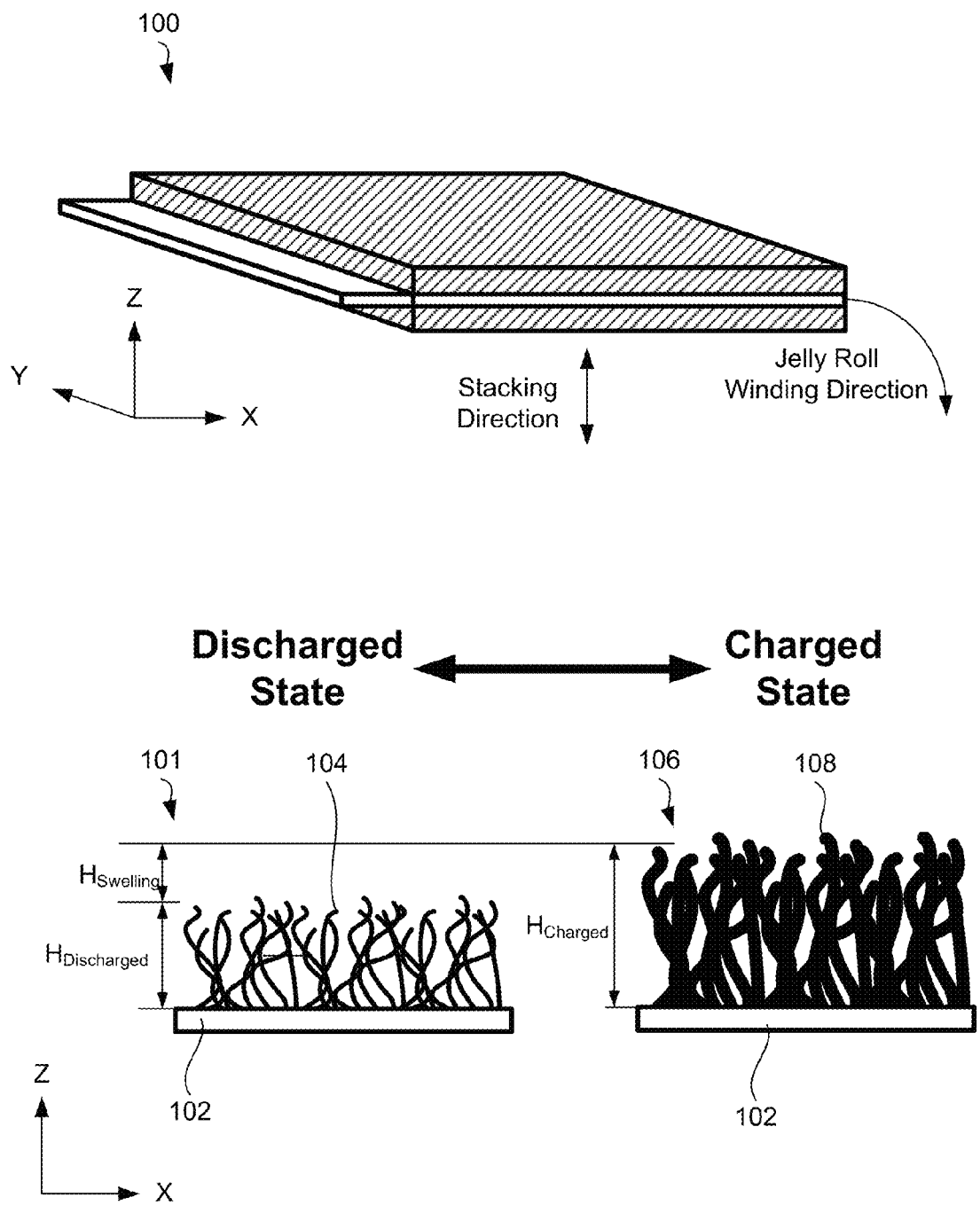
FIG. 1A is a schematic representation of an electrode orientation and a substrate with substrate rooted nanowires in charged and discharged states in accordance with certain embodiments.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Introduction

Conventional substrates used in lithium ion electrodes are typically thin metallic foils, such as a rolled copper foil for negative electrodes or a rolled aluminum foil for positive electrodes. Such substrates have low surface roughness and relative low surface area per unit volume. They are used to provide mechanical support for the active materials and/or to conduct electrons between the active materials and the battery terminals.

In various embodiments described herein, the substrate has an open structure. A substrate with an open structure may take various forms including, for example, a porous block, a foam, or a mesh. Another example of an open structure substrate is a perforated sheet or a rough sheet (e.g., a sheet having a roughness of at least about 0.1 micrometers $R_a$). In general, an open structure substrate will contain solid portions and openings (e.g., voids, pores, cavities, punctures, and/or scratches) positioned in between the solid portions. In certain embodiments, a surface area of an open structure substrate is greater than that of the corresponding solid version of the substrate (one having the same volume as the open structure).

To facilitate understanding of various aspects of the invention, certain terms, such as "substrate layer" and "electrode layer," will be used herein. Generally, the term "substrate layer" refers to the region occupied by the current collector substrate, including both the material of the substrate itself and any unoccupied or void regions, i.e., solid portions and openings. A substrate layer's boundaries may be defined by a generally trapezoidal volume having flat surfaces tangential to the outermost points of the substrate material. For a rolled foil with low surface roughness the substrate layer substantially corresponds to the substrate material itself. As surface roughness increases, the substrate layer becomes greater than the volume occupied by the solid substrate materials (i.e., a material volume). In other words, a void volume between the flat surfaces that are tangential to the peaks of the rough surfaces is added to the material volume to define the substrate layer. Similarly, for mesh or porous substrates which have substantial void volumes, the substrate layer volume is substantially greater than the volume occupied by the substrate material's volume. Overall, a substrate layer is a combination of solid portions of the substrate and its openings, and the substrate layer volume equals to a sum of the solid portions' volume and openings' volume.

An "electrode layer" refers to the region occupied by the electrode, including the material comprising the electrode active material, the substrate, and any void regions. As with the substrate layer, the electrode layer's boundaries may be defined by a generally trapezoidal volume having flat surfaces tangential to the outermost points of the electrode. In a conventional electrode with a flat foil substrate, an electrode layer is a combination of a substrate layer and one or two active layers, each containing the electrochemically active material of the electrode and optionally additional electronically conductive and/or ionically conductive materials. Thus, a substrate layer is abutted to but separate from the active layers. This configuration presents certain challenges when high capacity nanostructured materials are used in electrodes.

FIG. 1A illustrates a schematic representation of an electrode in accordance with certain embodiments. A perspective view 100 of an electrode is shown to provide X-Y-Z Cartesian axes relative to the overall orientation of the electrode. This X-Y-Z reference applies to all embodiments illustrated in FIGS. 1A-1F and is reflected at the left bottom corner of each figure. An electrode may have a flat solid substrate with active materials arranged in a layer adjacent to the substrate. For example, FIG. 1A illustrates a flat solid substrate 102, such as metal foil, with substrate rooted nanowires attached to the substrate. These nanowires are illustrated in a discharged state 101 (i.e., discharged nanowires 104) and in a charge state 106 (i.e., charged nanowires 108). The two states, charged and discharged, are defined by presence (charged active material) or absence (discharged active material) of charge carrying materials, such as lithium ions or lithium, in the nanowires or other active material structures. In lithium ion full cell embodiments, charged and discharged states of the negative active material nanowires correspond to the charge and discharged states of the overall electrochemical cell. This correspondence is reversed for a lithium ion positive electrode. Discharged nanowires 104 transform into charged nanowires 114 when charge-carrying ions are introduced into their structures, e.g., lithiation of negative active materials in lithium ion cells, and then back into discharged nanowires when active materials are removed from the structures. It should be noted that certain approaches described herein are also applicable to active materials having structures other than substrate rooted nanowires (e.g., thin layers, structures bound to the substrate with a polymeric binder).

During charging, active material structures, e.g., substrate rooted nanowires and others, may increase in size/"swell" due to insertion of charge-carrying ions into the active materials structures. For example, silicon swells as much as 400% when charged to its theoretical capacity limit of $Li_{4.4}Si$. As a result an active layer attached to flat solid substrate 102 may substantially increase in thickness. FIG. 1A illustrates a height or a thickness of the active layer increased from $H_{Discharged}$ (of a discharged electrode on the left) to $H_{Charged}$ (of a charge electrode on the right). This difference is labeled as $H_{Swelling}$. Flat solid substrate 102 is not configured to provide any substantial amount of volume that swollen active material structures 108 can expand into. As a result, active material structures 108 expand away from substrate 108 effectively increasing the thickness of the active layer by $H_{Swelling}$ and, as a result, the thickness of the overall electrode. Substrate 102 remains generally in the same form and position.

Because the electrochemical cells are tightly packed in order to accommodate as much active material as possible for a given volume, electrode swelling may increase pressure between cells' internal elements, such as electrodes, separator layers, inner surfaces of the cases, etc. This pressure is not desirable because it can cause internal shorts, deformation and degradation of cell components, and other problems.

Substrates having open structures may be designed to perform in a different way than flat solid substrates described above. For example, open structures may accommodate at least some parts of the active material layer. In these embodiments, there is an overlap between a substrate layer and an active layer. In some cases, the electrode layer and the substrate layer occupy the same volume. For example, a conductive substrate may be a perforated sheet with multiple openings, and a nanostructured active material is deposited into the openings but not on the external surfaces of the sheet. Because substrates with open structures provide a relatively large surface area per unit volume, such substrates may provide improved mechanical and electrical interactions between the active material and the substrate. Further, open regions within a substrate may facilitate ionic transfer within the electrode layer by allowing more easy penetration of the liquid electrolyte into to the interior regions of the electrode layer (i.e., the open regions facilitate electrode irrigation). Finally, open structures may accommodate swelling of active materials structures and reduce an overall change in thickness of the electrode. In certain embodiments, overall outer dimensions of the electrode remain substantially the same during cycling. These and other characteristics and examples of substrates with open structures are described below.

Substrate layers and electrode layers may be characterized by their "fractional void volumes." A fractional void volume is defined as a ratio of a void volume to the total volumes (including both voids and substrate/electrode materials) of the layer. In the case of porous materials, the fractional void volume is equivalent to the porosity. A rolled foil with low surface roughness has a fractional void volume of approximately 0%. As roughness increases the fractional void volume also increases. In certain embodiments, a substrate layer with open structures has a fractional void volume of at least about 10% or, more specifically, at least about 20%, at least about 30%, at least about 50%, at least about 60%, or at least about 70%, or at least about 90%, or at least about 95%. The fractional void volume should be considered in light of the substrate layer and electrode layer definitions presented above.

Figure 1B:
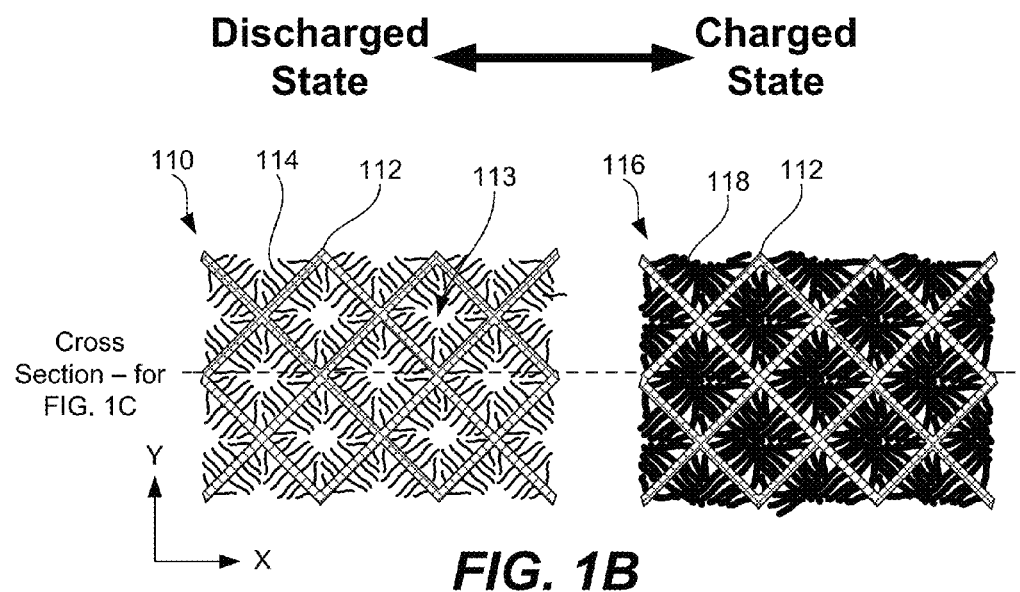
FIG. 1B is a schematic representation of a top view of an electrode portion with a substrate having open void structures and substrate rooted active structures attached to the substrate in charged and discharged states in accordance with certain embodiments.
Figure 1C:
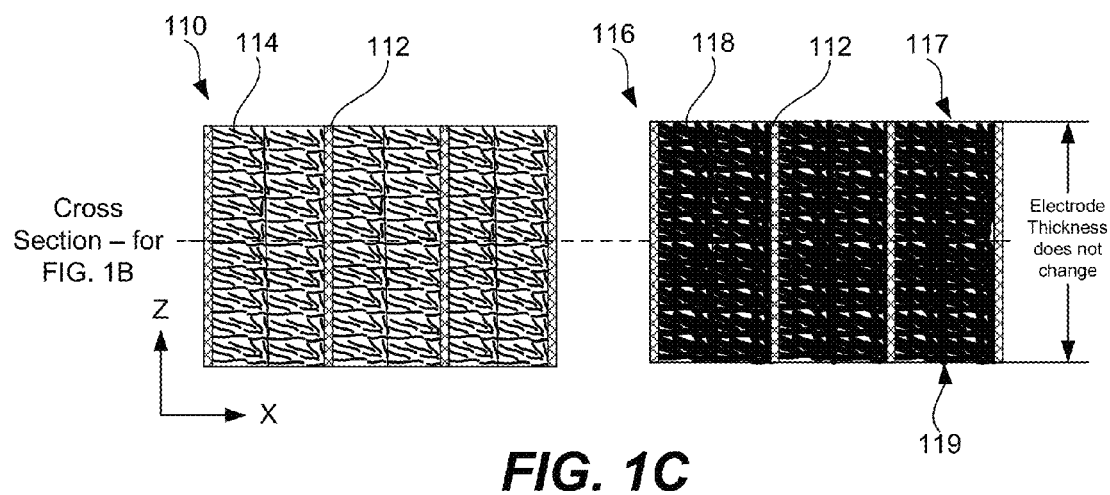
FIG. 1C is a schematic representation of a side view of an electrode portion with a substrate having open void structures and substrate rooted active structures attached to the substrate in charged and discharged states in accordance with certain embodiments.

FIG. 1B is a schematic representation of a top cross-sectional view of an electrode portion with a substrate 112 having open structures and substrate rooted active material structures (element 114 in a discharge state and element 118 in a charged state) attached to the substrate 112 in accordance with certain embodiments. The electrode portion is illustrated in a discharged state (element 110) and a charged state (element 116). The substrate 112 may have a plurality of opening or channels 113 that protrude through a part or an entire thickness of the substrate layer. A more specific example of channels protruding though the entire substrate thickness is illustrated in FIG. 1C. Such channels may provide certain functionalities, such as ionic communication between the top surface 117 and the bottom surface 119 of substrate 112, which is described below in more details.

Returning to FIG. 1B, openings 113 may have various cross-sectional profiles, e.g., round, oval, square (as shown in FIG. 1B), rectangular, and others. Cross-sectional profiles are generally dependent on manufacturing methods, substrate materials, opening sizes, and other factors. These profiles may also change during cell cycling. For the purposes of this application, a cross-section dimension of an opening is defined as a distance between the two most separated points on a periphery of the opening. For example, a cross-section dimension of a square channel illustrated in FIG. 1B is a diagonal of the square. In certain embodiments, a cross-section dimension of nanostructures is between about 1 micrometer and 1000 micrometers. In more specific embodiments, a cross-section dimension is between about 10 micrometers and 100 micrometers, or more specifically between 40 micrometers and 80 micrometers.

In certain embodiments, the substrate 112 is an electroformed mesh. Various examples of electroformed meshes are available from Industrial Netting in Minneapolis, Minn. and other suppliers. For example, Industrial Netting supplies electroformed meshes made from copper, nickel, gold, and other materials with cross-section dimensions ranging from about 7.6 micrometers for Model No. BM 2000-01 to 5,028 micrometers for Model No. BM 0005-01. Other characteristics of mesh substrates are further described below.

In certain embodiments, when active material structures attached to the substrate are charged and swollen, the electrode is configured in such a way that its thickness remains substantially the same. For example, a substrate may provide a sufficient internal room for the active materials to expand into without impacting the overall external dimensions of the electrode. In other words, the active material may swell within the substrate openings 113 and occupy parts of these openings in a charged state representation 116 of the electrode portion in FIGS. 1B and 1C.

In some cases, a substrate may be characterized by its own fractional void volume without accounting any deposited active materials. In certain embodiments, the substrate's fractional void volume is at least about 50% or, in more specific embodiments, at least about 70%, or at least about 90%. A fractional void volume of the electrode layer accounting both the substrate and deposited active materials in a fully discharged state (e.g., after depositing and before initial charging) may be at least about 30% or, in more specific embodiments, at least about 50%, or even at least about 70%. A fractional void volume of the electrode layer accounting both the substrate and fully charged active materials (e.g., charged to their design capacity) may be at least about 10% or, in more specific embodiments, at least about 30%, or even at least about 50%. In certain embodiments, a design capacity may be at least about 40% of the theoretical capacity or, more particularly, at least about 60% of the theoretical capacity, or even at least about 80% of the theoretical capacity.

FIG. 1C is a schematic representation of a cross-sectional view of the electrode portion in accordance with certain embodiments. In specific embodiments, FIG. 1C represents a side view of a structure shown in FIG. 1B as shown by the "X-Y" directional arrows in FIG. 1B and by the "X-Z" directional arrows in FIG. 1C. An electrode portion in a discharged state (element 110) and a charged state (element 116) is shown. FIG. 1C illustrates that the thickness of the electrode portion, which is the distance between top surface 117 and bottom surface 119, does not substantially change during cycling, i.e., between charged state 110 and discharged state 116. Swelling of the active materials by going from the discharged active material structures 114 to charged active material structures 118 is accommodated by the substrate's void volume as described above. The electrode thickness may be between about 10 micrometers and 1,000 micrometers or, more specifically, between about 20 micrometers and 400 micrometers, between about 40 micrometers and 200 micrometers. In certain embodiments, like the one shown in FIG. 1C, top surface 117 and bottom surface 119 of the substrate layer are substantially free from the active material. The active material is deposited on the internal surfaces of the substrate layer, such as internal sidewalls of the channels. This configuration may be achieved, for example, by masking the top surface 117 and the bottom surface 119 during active material deposition and/or by stripping the deposited active materials from the top surface 117 and the bottom surface 119 after deposition. A perforated foil may be used as a starting substrate for this assembly.

Figure 1D:
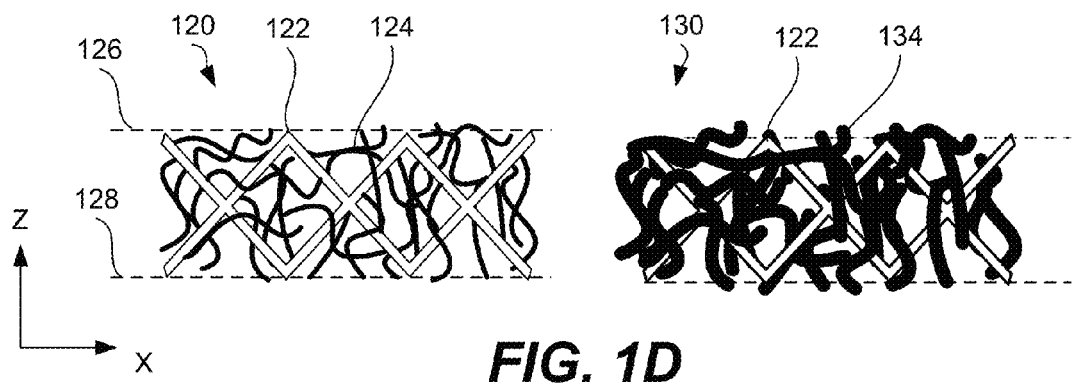
FIG. 1D is a schematic representation of a substrate with open void structures and substrate rooted active structures deposited on the substrate and distributed throughout the substrate and electrode layers in accordance with certain embodiments.

Substrates with sufficiently large fractional void volumes may help to mitigate some detrimental effects of active material swelling. FIG. 1D illustrates a schematic representation of a substrate 122 with open structures and a substrate rooted active material 124 deposited on substrate 122 and distributed throughout the substrate and electrode layers in accordance with certain embodiments. In this specific example, the substrate layer and the active material layer coincide with each other and are defined by planes 126 and 128. These planes also define an overall electrode layer 126 and 128. During charging, active material structures 124 increases in size due to lithiation and results in swollen structures 134. Because discharged electrode 120 had a sufficiently large fractional void volume, i.e., enough open spaces, the increase in volume of the active material has been largely accommodated by the voids. As a result, the thickness of the electrode (or a volume of the electrode layer) may not change or at least increase less than for an electrode with a solid flat substrate such the one shown in FIG. 1A.

Figure 1E:
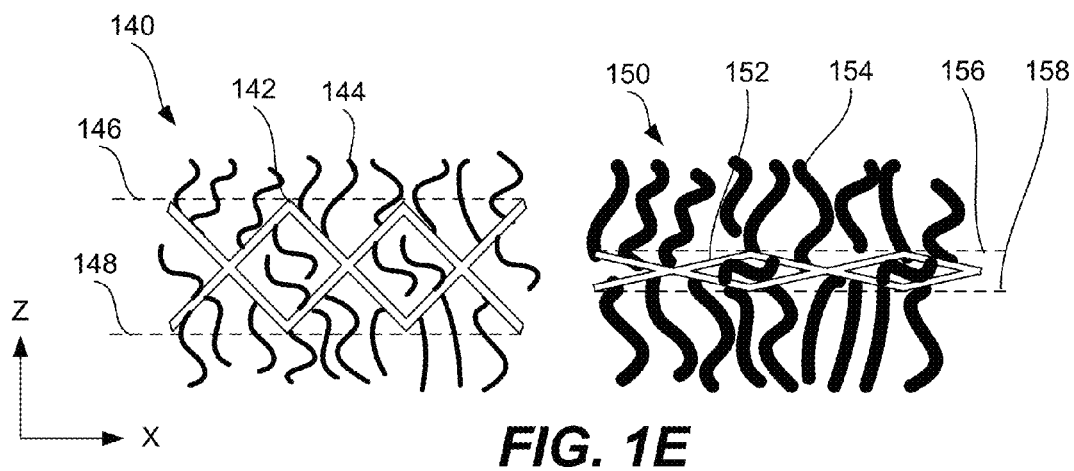
FIG. 1E is a schematic representation of a collapsible substrate with open void structures and substrate rooted active structures deposited on the substrate and distributed throughout the substrate and electrode layers in accordance with certain embodiments.

As described in the example above, a substrate layer and associated substrate material may remain substantially unchanged during cycling, i.e., it undergoes little or no change in a position and/or an overall thickness. However, in certain embodiments, a substrate may be configured in such a way that it changes its size and, possibly, its shape and position during cycling. For example, a substrate may partially collapse and form a thinner layer during charging to accommodate swelling of the active materials. The overall thickness and volume of the electrode may remain substantially the same. FIG. 1E illustrates a schematic representation of a collapsible substrate with open structures and substrate rooted active material structures deposited on the substrate in accordance with certain embodiments. In a discharge electrode 140, substrate 142 is characterized by a substrate layer defined by planes 146 and 148. Active material 142 may be distributed both within the substrate layer and/or outside of the substrate layer as, for example, shown in FIG. 1E. In certain embodiments, the active layer may coincide with the substrate layer. In a charged electrode 150 active materials 154 are swollen and may push on the substrate layer causing it to partially or completely collapse under the pressure from expanding active materials 154. Various types of substrates (e.g., meshes, foams) may be designed to collapse under certain pressures.

Substrates with open structures have larger surface areas per unit volume than flat foil substrates. Larger surfaces provide more contact interface for active materials. For example, a woven copper mesh with mesh size 200 available from TWP, Inc. in Berkeley, Calif. (part number 200X200C0020W36T) provides a surface area that is four times greater than a foil, based on the volume of the solid material. In another example, an electroformed nickel mesh with mesh size 2000 available from Industrial Netting in Minneapolis, Minn. (part number BM 2000-01) has a fractional void volume of only about 20% yet provides about 100% more surface area per volume than the flat sheet.

Substrates with large surface areas improve interaction between the substrates and the deposited active materials. For example, they provide, on balance, more direct paths for electrons to flow between sites of electrochemical reactions and the closest points on the substrate. Such substrates may be particular useful for nanostructures that are directly deposited on substrates (e.g., substrate rooted nanostructures). Because of the small dimensions of these nanostructures, large surface areas are useful to achieve adequate active material loading in an electrode. One such example is substrate rooted nanostructures described in U.S. patent application Ser. No. 12/437,529 filed on May 7, 2009, which is incorporated by reference herein in its entirety for purposes of describing nanostructures.

Another example of electrodes employing an open structure substrate has an amorphous silicon layer deposited over the exposed substrate surface. Amorphous silicon layer may be deposited using, for example, chemical vapor deposition (CVD) or any other suitable technique. A bulk silicon layer may have a high initial capacity, but it rapidly fades during due pulverization of the layer. Keeping a layer thinner that a thickness threshold may help to overcome pulverization. The threshold is typically determined by a type of an active material, charging properties, and other cell design and operating parameters. For many high capacity materials, this threshold may be less than 1 micron. For example, an amorphous silicon layer may be deposited with a thickness of less than about 500 nanometers or more specifically with a thickness of less than about 100 nanometers. Large surface area substrates may allow depositing layers of high capacity active materials than do no exceed their corresponding thresholds, yet the overall electrodes have enough materials to provide certain capacity levels.

Figure 1F:
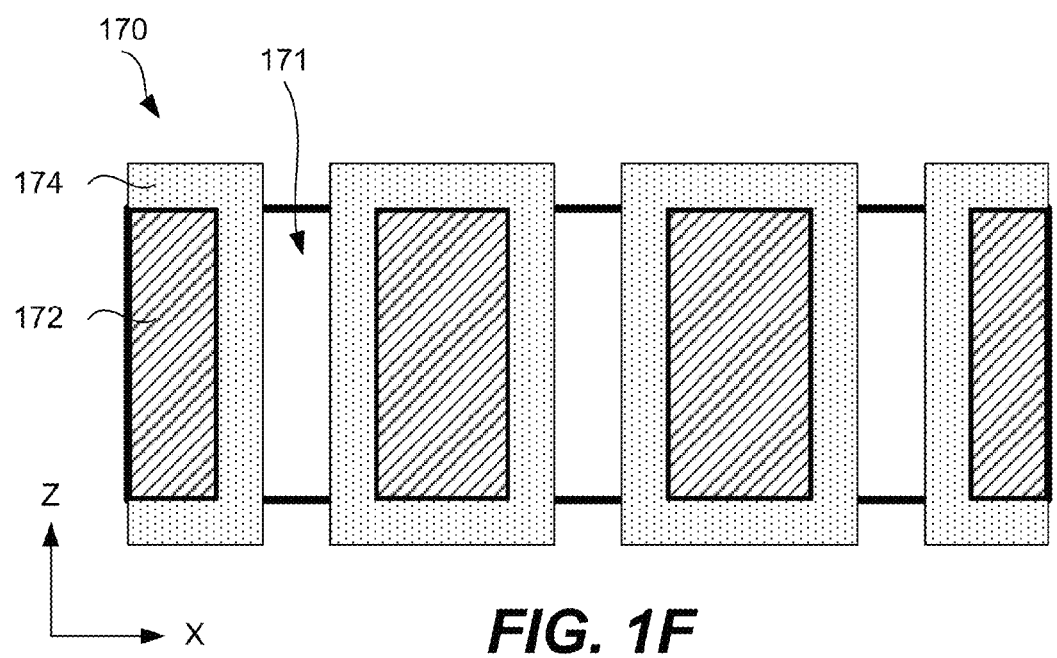
FIG. 1F is a schematic representation of a flat substrate with open void channels protruding through the substrate and an active material layer deposited on the substrate surfaces and distributed throughout the substrate and electrode layers in accordance with certain embodiments.

FIG. 1F illustrates a schematic representation of a substrate 172 with open areas 171 and an active material layer 174 deposited on the substrate surfaces in accordance with certain embodiments. One example of substrate 172 is a perforated foil where substrate 172 represents portions of metal and open areas 171 represent perforations. The thickness of active material layer 174 may be kept below a predetermined threshold as described above. Because substrate 172 has a sufficiently large surface area (e.g., enhanced by open areas 171 in comparison with open substrates), a substantial amount of the active material may be deposited to provide enough electrochemical capacity.

Figure 1G:
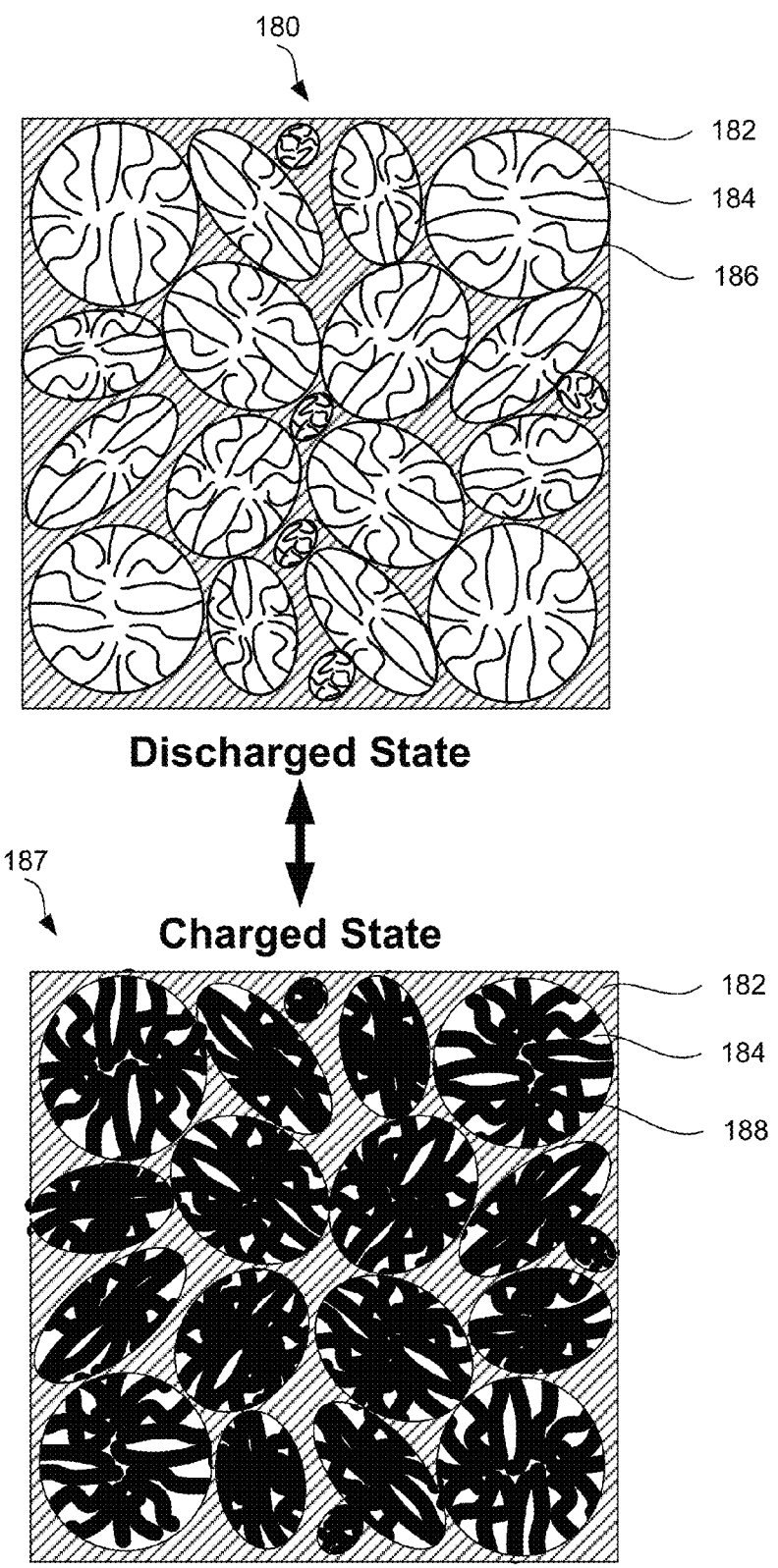
FIG. 1G illustrates one example of a substrate with randomly oriented open structures and nanowires containing active materials deposited within these open structures in charged and discharged states in accordance with certain embodiments.

In certain embodiments, a substrate has randomly oriented open structures. Examples of such substrates include, but are not limited to, open and close cell foams, sponges, layers with randomly oriented fibers, meshes with random openings, layers of woven fibers, layers of unidirectional fibers, layers with alternating unidirectional fibers, expanded metal structures, porous films, and others. FIG. 1G illustrates one example of an electrode portion with a substrate 182 having randomly oriented open structures 184 and active material nanowires 186 and 188 deposited within these open structures 184 in accordance with certain embodiments. A discharged state is illustrated with an electrode portion 180, while a charge state is illustrated with an electrode portion 187. Open structures 184 may provide adequate spacing within the substrate layer to accommodate nanowires swelling during charging, i.e., expanding from the discharged nanowires 186 to the charged nanowires 188. In certain embodiments, substantially no swelling is experienced by the overall electrode structure during cycling. In certain embodiments, an electrode swells less than 50% or, in more specific embodiments, less than 25% on average from its initial thickness. Further, open structures 184 may provide pathways for lithium ions (or other charge carrying ions depending on the cell type) to reach nanowires 186 and 188. This improved ionic pathway allows using thicker substrates/electrodes. In certain embodiments (not shown), a substrate with randomly oriented open structures may expand from the pressure exerted by the nanowires deposited within the substrate. For examples, the substrate may be made from elastic materials, such as copper, nickel, graphene or graphite, metal coated plastics, and combinations thereof. Additional description pertaining to the substrates with randomly oriented open structures is provided below in the context of the foam structures.

Substrate Materials

A substrate material is typically selected to be highly conductive as well as chemically and electrochemically stable. Other factors may include resistance to active ion adsorption in a given potential range and susceptibility to dendrite formation. Examples of types of materials suitable for the solid portion of an open structure substrate include metals, metal-coated plastics, metal-coated carbon, and conductive ceramics. Aluminum is a common material for positive electrodes, while copper is common for negative electrodes. Other substrate materials may include stainless steel, titanium, nickel, molybdenum, platinum, iridium, tungsten, and combinations of thereof. The solid portion may include only one component (e.g., it may have a homogeneous composition) or multiple components. In some examples, the solid portion may have a core-shell arrangement. The substrate shell is used for contact with electrode active materials and, in some cases, with an electrolyte. A metalized plastic is one example of a composite substrate. A composite structure having fibers, wires, or particles of a first component embedded in (or otherwise mixed with) one or more other components is another example.

A cross-sectional solid area of the substrate is typically chosen based on intended capacity and/or charge/discharge rates of the cell. For some lithium ion cells, open structure substrates should provide an electronic conductivity similar to a 20-30 micrometer thick aluminum foil or a 10-15 micrometer thick copper foil having the same width. In certain embodiments, substrate materials have an electronic resistivity of at least about $6.4 \times 10^{-7}$ Ohm-centimeter, and in more specific embodiments between about $5 \times 10^{-6}$ Ohm-centimeter and $5 \times 10^{-50}$ Ohm-centimeter. In some cases, substrate materials have an elastic modulus of between about 1 and 200 GPa. Further, in some cases, substrate materials have a yield point of at least about 20 MPa.

Substrate Structure and Fabrication Methods

As mentioned, open structure substrates include multiple openings such as, voids, pores, cavities, punctures, deformations, and/or scratches. Open substrates may be categorized in a variety of ways, e.g., based on their structures, fabrication methods, and properties. General structural categories may include woven and non-woven meshes (random, electro-formed, mechanically punched, ablated), open and close cell foams (e.g., metal or metal coated), and porous solids. Such substrates may be fabricated using, for example, sintering fibers, ablating foil, polydimethylsiloxane (PDMS) molding, mechanical punching, electrochemical etching (including lithography), electrospinning fibers, foaming, weaving, felting, etc. Other substrate examples include an open structure substrate, such perforated sheets or rough surface sheets, e.g., sheets having a roughness of at least about 1 micrometer $R_a$.

Certain open structure substrates may be permeable to electrochemically active ions of the electrolyte, i.e., the ions may pass through a substrate layer. This property may be beneficial for controlling active materials loadings in electrodes, which is explained below in the context of FIGS. 2A-2B.

Figure 2A:
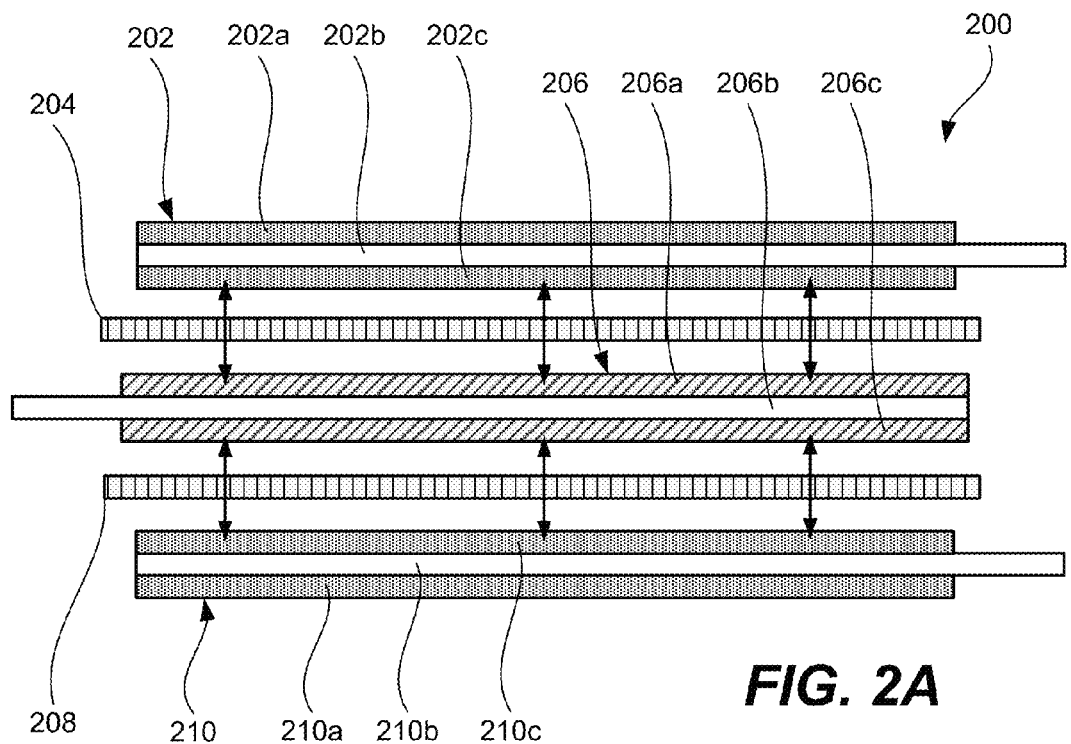
FIG. 2A is a schematic representation of a stack of three electrodes containing substrates impermeable to electrochemically active ions in accordance with certain embodiments.

FIG. 2A is a schematic representation of a stack 200 containing three electrodes where a middle electrode 206 has a substrate 206b impermeable to electrochemically active ions. This stack may represent a segment of electrode/separator jellyroll, for example. The three-electrode stack also includes two electrodes 202 and 210, which are referred here as "outer" electrodes. Separator sheets 204 and 208 are positioned between middle electrode 206 and outer electrodes 202 and 210. Middle electrode 206 has two active layers 206a and 206c positioned on each side of substrate 206b. In certain embodiments, active layers may overlap with a substrate layer. Active layer 206a is in ionic communication with an active layer 202c of outer electrode 202. Similarly, active layer 206c is in ionic communication with an active layer 210c of outer electrode 210. In certain embodiments, where substrates 202b, 206b, and 210b are impermeable, there is no other ionic communications between the active layers other than the ones described above. In this example, if an active layer 202c is a positive electrode active layer and it has an excess active material, the corresponding negative electrode active layer 206a needs to also have at least a proportionate excess amount of the negative active material to avoid overcharging and lithium dendrite formation. For example, in a conventional lithium ion cell, a negative electrode layer is designed to have about 110% active material relative to a corresponding positive electrode layer based on relative capacities of the two layers (e.g., a design capacity per area of the negative electrode layer is 10% than that of the corresponding positive electrode layer) to accommodate for any variations of active material loading in the two layers. Generally, very few positive electrodes have both active layers with excess of active materials. However, since the frequency of appearance and the location of locally thicker positive electrode layer can not be predicted (due random fabrication variations), every negative electrode active layer is conventionally overcompensated with active materials to prevent dendrite and other problems.

Figure 2B:
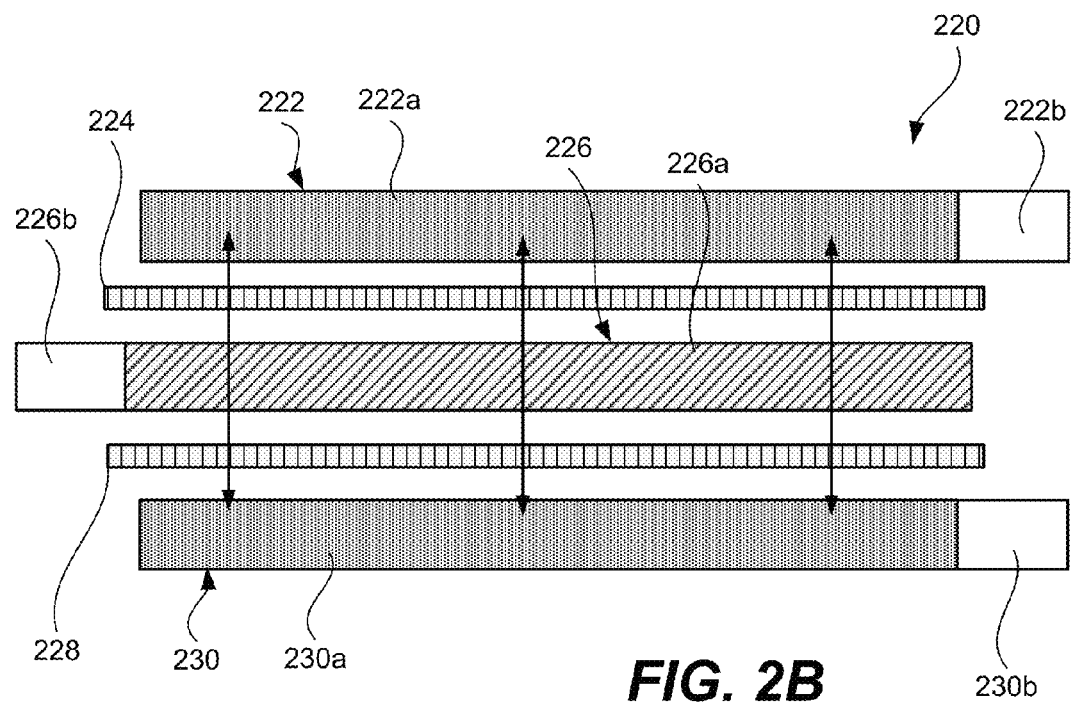
FIG. 2B is a schematic representation of a stack of three electrodes containing substrates permeable to electrochemically active ions in accordance with certain embodiments.

One way to mitigate the above problem without a need to substantially overcompensating the negative electrode layer(s) (e.g., by adding 10% of extra negative active material based on capacity) and, thus, to waste valuable space inside the cell for unused negative active material is to use positive electrode substrates that are permeable to ions. In this case, at least two negative electrode layers may be available for ionic communication with each positive electrode. FIG. 2B illustrates a schematic representation of a stack 220 with three electrodes 222, 226, and 230 containing substrates 226, 226b, and 230b that are permeable to electrochemically active ions in accordance with certain embodiments. If an electrode 226 has an excessive positive active material 226a, ions generated by this materials may lithiate active materials 222a and 230a. Since two negative electrode active layers are in direct ionic communication with each positive electrode active layer, the overcompensation of negative active material can be substantially less. In certain embodiments employing an open substrate, a negative active layer has a capacity per unit area that is at least about 2% higher than such corresponding capacity of the positive electrode layer. In more specific embodiments, this excess in capacity per area may be at least about 3%, at least about 4%, at least about 5%, or at least about 6%. More generally, an excess in the capacity per area may be determined based on accuracy of the deposition processes used during fabrication of the negative electrode and positive electrode.

Mesh substrates may be woven or non-woven. Typically, a mesh contains wires or that are interconnected into a flat sheet or mat. Specific examples of meshes include woven fabrics, knitted fabrics, braids, laces, nets, felt, paper, nonwoven fabrics, uniaxially orientated sheets, and mats. A mesh may be characterized in many ways including its fiber/wire diameter or width, the length of a strand between adjacent intersecting wires or fibers, the number of mesh openings per unit length, the average size of the openings, and the like. In certain embodiments, the fiber/wire has a diameter of between about 10 nanometers and 10 micrometers, and in more specific embodiments, between about 100 nanometers and 1 micrometer. In some cases, the mesh fibers/wires have a length of about 1 millimeter to 1000 millimeters between adjacent fibers or wires that intersect with the fiber or wire whose length is being considered, and in more specific embodiments, the length is about 10 millimeters to 100 millimeters.

Mesh substrates can be also characterized by a mesh size, which is defined as a number of wires per linear inch in each direction of the mesh. For example, mesh 200×200 has two hundred wires per linear inch in each direction. Sometimes meshes with equal number of wires in both directions are described with a single number (e.g., mesh 200). In certain embodiments, a mesh substrate has a mesh size of at least about 10 or, more specifically, at least about 100 or even at least about 1000.

Mesh may be fabricated using various methods, such as weaving, mechanical punching, electroforming. Electroformed mesh has more controlled shaped and smoothness of aperture walls. The overall finish may be better than that for other meshes type leading to a lower surface tension, which may be needed for certain active material deposition processes further described below. Further, electroformed meshes have no residual mechanical stresses, fewer burs and rough edges, consistent properties of mesh materials, and could have surface treatment performed during electroforming process (e.g., depositing a catalyst or a diffusion barrier layer).

Another example of a substrate with open structures is a nanofiber paper. Such paper may be formed from nanofibers, such as 60 nanometer PR-25 nanofibers from Applied Sciences in Cedarville Ohio. The surface area of such paper may be around 5-100 meter square per gram, wherein the porosity can be about 50-95% by volume. In certain embodiments, such paper can be coated with a thin layer of silicon by any number of vapor deposition techniques, such as chemical vapor deposition, pulsed laser deposition, plasma chemical vapor deposition, physical vapor deposition, electron beam, or magnetron sputtering.

Foams or porous solids represent another type of open structure substrates that may be used in lithium ion electrodes. In certain embodiments, such substrates have a fractional void volume of between about 10% and 99% or, more specifically, between about 75% and 95%. In some embodiments, the substrate's pores or openings have, on average, a diameter or width of between about 1 micrometer and 5 millimeters. One example of a foamed substrate is a nickel foam available from Sumitomo Electric Industries, Ltd in Japan, e.g., product name: Celmet.

Foams may have open cell and close cell structures. Open cell foams may be used to deposit active materials throughout the entire substrate layer. While closed cell foams may only allow depositing active material on the outer exposed surface, such foams may be used for their compressibility and/or high external surface area.

Various methods may be used to make metal foams. For example, aluminum metal foams may be made by bubbling a process gas thorough molten aluminum-silicon carbide (Al—SiC) or aluminum-aluminum oxide ($Al—Al_2O_3$) alloys or by stirring a foaming agent, such as titanium hydride ($TiH_2$), into a molten aluminum allow and controlling the pressure during cooling. In another example, a metal powder may be mixed with a foaming agent, such as titanium hydride ($TiH_2$), followed by heating into the mushy state. The foaming agent then releases hydrogen, expanding softened metal materials. In another example, a ceramic mold may be first fabricates. The process may continue with burning out the ceramic material and pressure infiltration with molten metal or metal powder slurry which is then sintered. This method may be used to make aluminum, stainless steel, copper, and other metal foams. In yet another embodiment, vapor phase deposition or electrodeposition of metal onto a polymer foam precursor, which is subsequently burned out, leaving cell edges with hollow cores. This method may be suitable for nickel and titanium foams. Other metal foams, such as titanium foam, may be fabricates by trapping high pressure inert gas in power by powder hot isostatic pressing, followed by the expansion of the gas at elevated temperature. Another method involves sintering of hollow spheres, made by a modified atomization process, or from metal-oxide hydride spheres followed by reduction of dehydration, or by vapor-deposition of metal onto polymer spheres. Yet another method of fabricating copper, nickel, aluminum, and other metal foams involved dissolution of gas, such as hydrogen, in a liquid metal under pressure, allowing it to be released in a controlled way during subsequent solidification.

Aerogel is another example of foamed substrates. It can be prepared by infiltrating highly porous material, such as carbon papers, with an appropriate carbon foam precursor material which is subsequently cured and fired at high temperatures (e.g., 500° C.-3,000° C.) to form a thin sheet of carbon foam.

Process

Figure 3:
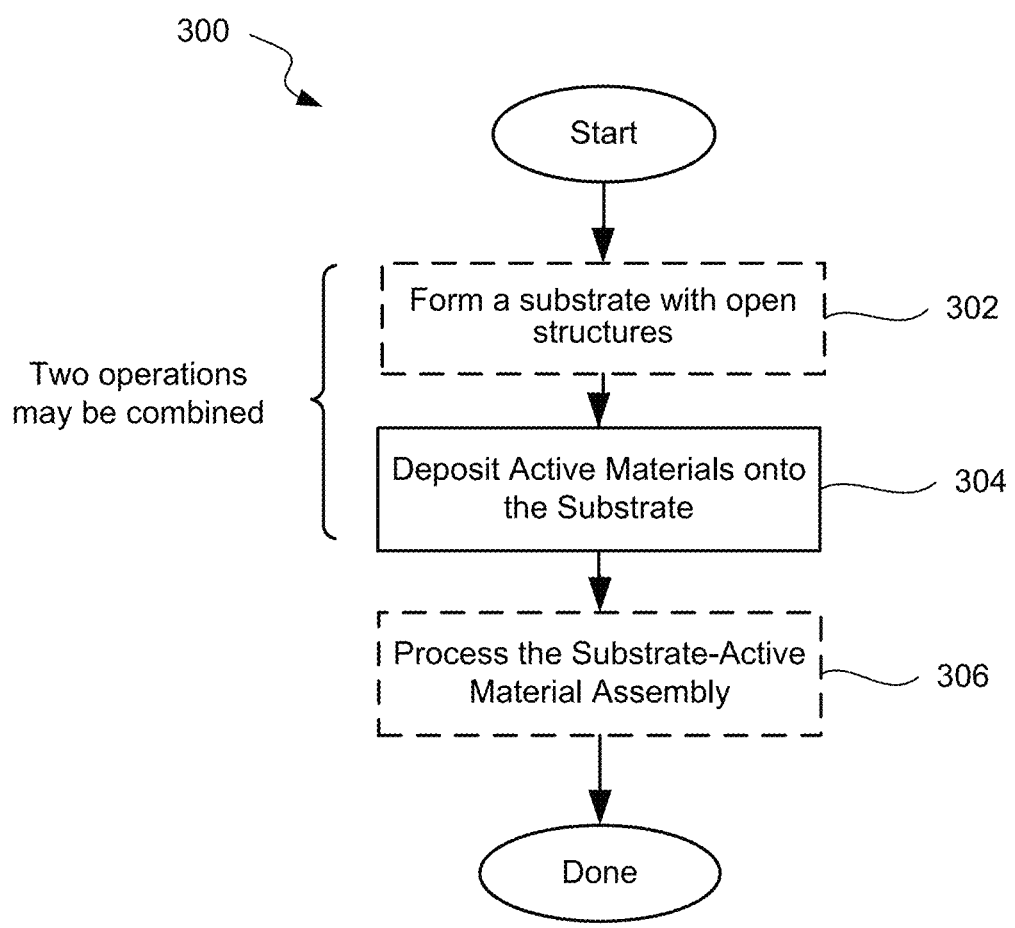
FIG. 3 is a flowchart of a general process for fabricating an electrode containing a substrate having open structures in accordance with certain embodiments.

FIG. 3 illustrates a flow chart of a general process 300 for fabricating an electrode containing an open structure substrate in accordance with certain embodiments. Process 300 may start with forming a substrate with open structures (block 302). Certain processes specific to different substrate types are described above. It should be noted that operation 302 is optional, and the entire process 300 may start with providing a preformed substrate with open structures.

Process 300 may proceed with depositing an active material onto a substrate in operation 304. In certain embodiments, operations 302 and 304 are combined. In other words, a substrate may be formed while the active material is being deposited onto the substrate. For example, fibrous substrate elements may be mixed with nanostructured active materials and then bound together, for example, by applying heat and pressure or having a polymer binder into the mixture.

In other embodiments, not shown in the FIG. 3, a substrate may be formed after depositing an active material on substrate elements. For example, discreet fibers may be coated with active materials and then formed into an active layer, e.g., woven into a fabric.

Active materials may be deposited using physical or chemical deposition methods. For example, one or more nanostructured active materials may be mixed into slurry (e.g., also containing a binder, solvent, and/or conductive additive) followed by coating the substrate surfaces with that slurry. Certain vacuuming and surface treatment techniques may be used to achieve thorough surface coating.

In other embodiments, chemical vapor deposition (CVD) may be used to deposit active materials on a substrate surface. Certain CVD details are described in U.S. patent application Ser. No. 12/437,529 filed on May 7, 2009, which is incorporated by reference herein in its entirety for the purposes of describing CVD processes. Applying certain catalyst materials, such as gold, onto a substrate surface may lead to a vapor-liquid-solid CVD mechanism.

In certain embodiments, active materials deposited on the substrate are in the form of nanowires. A "nanowire" is defined as a structure that has, on average, an aspect ratio of at least about four. In certain examples, the average aspect ratio may be at least about ten, at least about one hundred, or even at least about one thousand. Nanowire active materials can undergo substantial swelling without disrupting the overall structure of the active layer, provide better electrical and mechanical connections with the layer, and can be easily realized using the vapor-liquid-solid and vapor-solid template free growth methods or other templated methods.

In certain embodiments, activate materials are deposited over a substrate surface using CVD but without any catalyst. An amorphous silicon layer may be formed using such a deposition technique. The amorphous silicon layer may be between about 1 nanometers and 200 nanometers thick or, more particularly, between about 10 nanometers and 100 nanometers. Other high capacity active materials, such as tin and germanium, may be deposited using similar techniques.

Figure 4A:
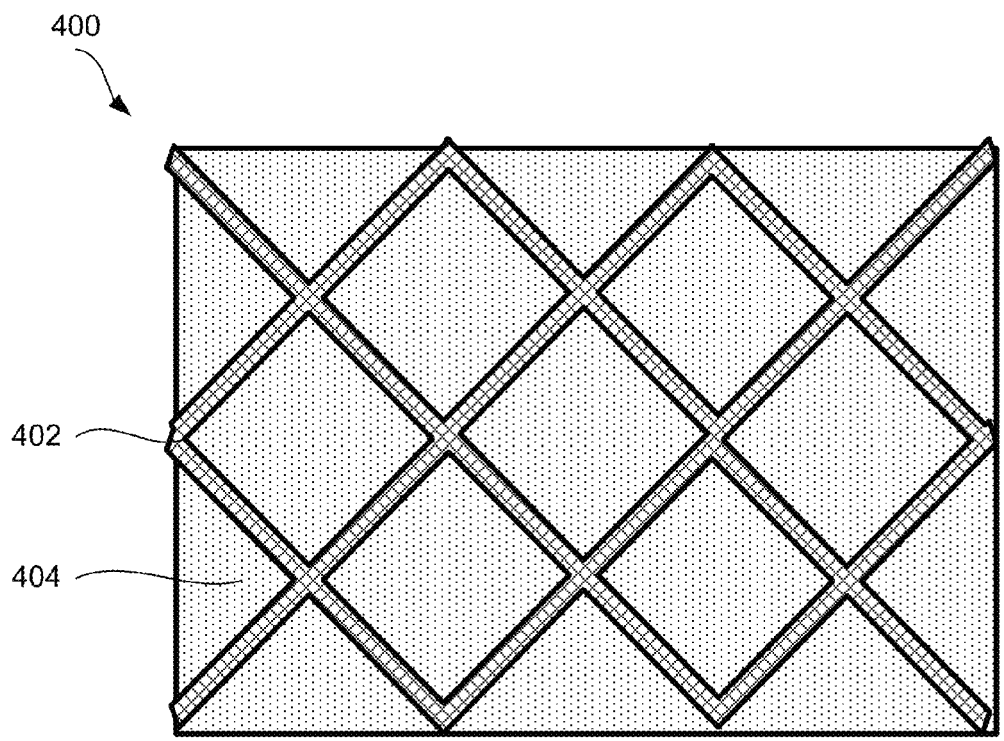
FIGS. 4A-4B illustrate an electrode containing substrate with open structures during different stages of the electrode fabrication process in accordance with certain embodiments.
Figure 4B:
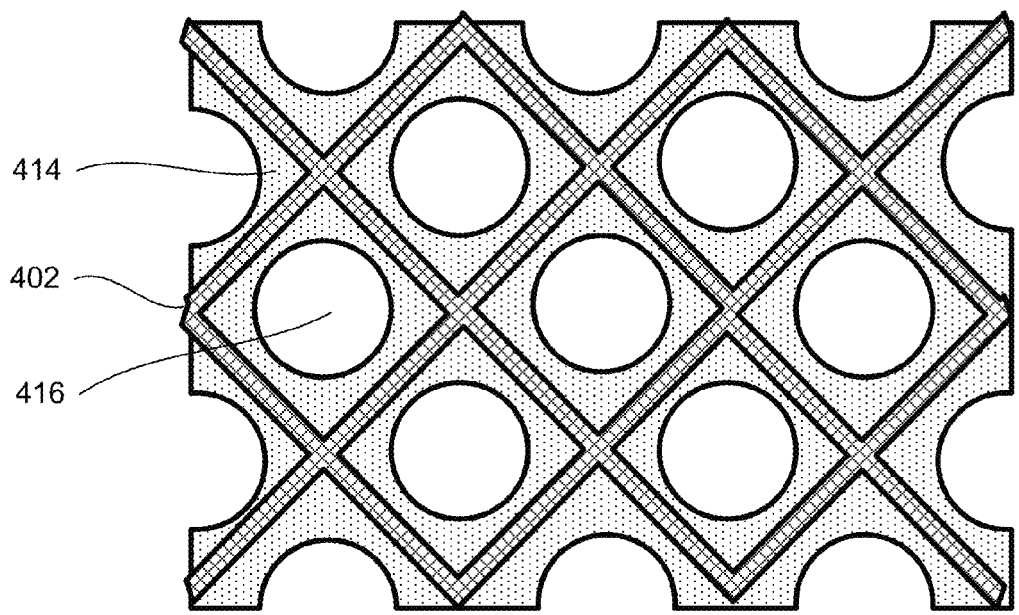

FIGS. 4A-4B illustrate an electrode containing an open structure substrate 402 during different stages of the electrode fabrication process in accordance with certain embodiments. During the first stage 400, substrate 402 may be filed with slurry 404 such that empty voids inside the substrate 402 are substantially filed, as illustrates in FIG. 4A. In certain embodiments, some voids or parts of voids main remain unfilled. For examples, at least about 10% of the initial voids may remain unfilled or, more specifically, at least about 20%, or at least about 50%. The electrode may be then dried by, for example, evaporating a solvent from the slurry deposit. The slurry filling the substrate voids may shrink forming new voids due to evaporation of solvents, polymerization, and/or other phenomena. The solvent content in the slurry may be at least about 10%, at least about 25%, or at least about 50% by weight. By controlling the surface tension and solvent content of the slurry, the new voids 416 may be formed in such a way that the remaining solid components of the slurry 414 (containing active materials) remains in contact with the substrate 402. The newly formed voids 416 may provide ionic pathways into the inside portions of the electrode.

In certain embodiments, a solid content of a polymer binder used to adhere active materials to open structures substrate may be less than would have been required for a typical flat-foil type of substrates. Without being restricted to any particular theory, it is believed that a combination of thinner layers and additional mechanical support provided by open structured substrate may allow reducing amount of binder. Generally, less binder may help to improve cell electrochemical performance.

Returning back to FIG. 3, the process may continue with an optional post-deposition operation to process an assembly that includes a substrate and active material (block 306) to form a final electrode ready that may be for battery fabrication. The post deposition processing may include compressing the substrate-active material assembly to a predetermined thickness, doping or functionalizing active materials, or performing any other operations. For example, an assembly may have excessive void spacing after depositing (e.g., be too porous) and may be compressed before being placed into a jelly roll or a stack of a battery as described below. Other operations of process 300 may include attaching electrical leads to electrodes, arranging electrodes into a jellyroll or a stack, inserting the arranged electrodes into a case, filling with electrolyte, sealing, and performing formation cycles. Some of these operations will now be described in more details below.

Sub-Assembly: Electrodes with Separators

Two common arrangements of the electrodes in lithium ion cells are wound and stacked. One goal is to position and align the surfaces of active layers of the two electrodes surfaces as close as possible without causing an electrical short. Close positioning allows lithium ions to travel more rapidly and more directly between the two electrodes leading to better performance.

Figure 5A:
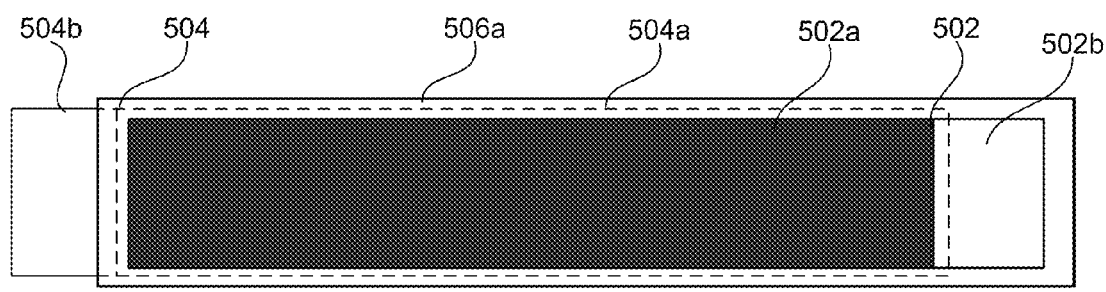
FIGS. 5A-B are a top schematic view and a side schematic view of an illustrative electrode arrangement in accordance with certain embodiments.

FIG. 5A illustrates a side view of an aligned stack including a positive electrode 502, a negative electrode 504, and two sheets of the separator 506a and 506b in accordance with certain embodiments. The positive electrode 502 may have a positive active layer 502a and a positive uncoated substrate portion 502b. Similarly, the negative electrode 504 may have a negative active layer 504a and a negative uncoated substrate portion 504b. In many embodiments, the exposed area of the negative active layer 504a is slightly larger that the exposed area of the positive active layer 502a to ensure trapping of the lithium ions released from the positive active layer 502a by intercalation material of the negative active layer 504a. In one embodiment, the negative active layer 504a extends at least between about 0.25 and 5 mm beyond the positive active layer 502a in one or more directions (typically all directions). In a more specific embodiment, the negative layer extends beyond the positive layer by between about 1 and 2 mm in one or more directions. In certain embodiments, the edges of the separator sheets 506a and 506b extend beyond the outer edges of at least the negative active layer 504a to provide electronic insulation of the electrode from the other battery components. The positive uncoated portion 502b may be used for connecting to the positive terminal and may extend beyond negative electrode 504 and/or the separator sheets 506a and 506b. Likewise, the negative uncoated portion 504b may be used for connecting to the negative terminal and may extend beyond positive electrode 502 and/or the separator sheets 506a and 506b.

Figure 5B:
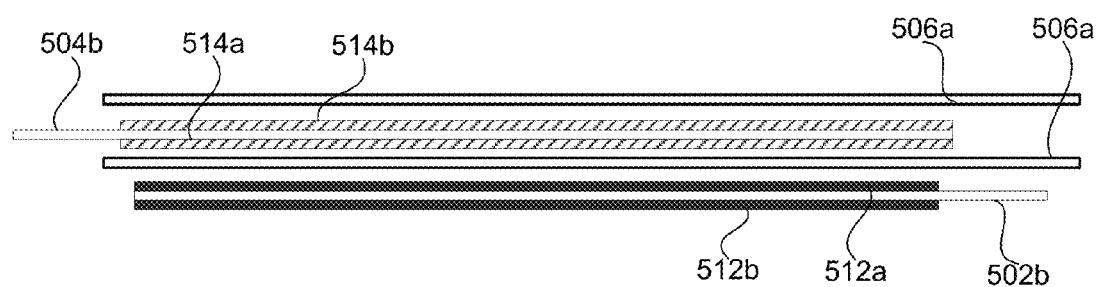

FIG. 5B illustrates a top view of the aligned stack. The positive electrode 502 is shown with two positive active layers 512a and 512b on opposite sides of the flat positive current collector 502b. Similarly, the negative electrode 504 is shown with two negative active layer 514a and 514b on opposite sides of the flat negative current collector. Any gaps between the positive active layer 512a, its corresponding separator sheet 506a, and the corresponding negative active layer 514a are usually minimal to non-existent, especially after the first cycle of the cell. The electrodes and the separators are either tightly would together in a jelly roll or are positioned in a stack that is then inserted into a tight case. The electrodes and the separator tend to swell inside the case after the electrolyte is introduced and the first cycles remove any gaps or dry areas as lithium ions cycle the two electrodes and through the separator.

Figure 6A:
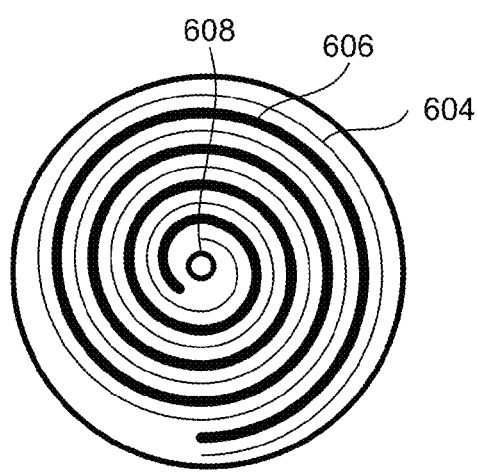
FIGS. 6A-B are a top schematic view and a perspective schematic view of an illustrative round wound cell in accordance with certain embodiments.
Figure 6B:
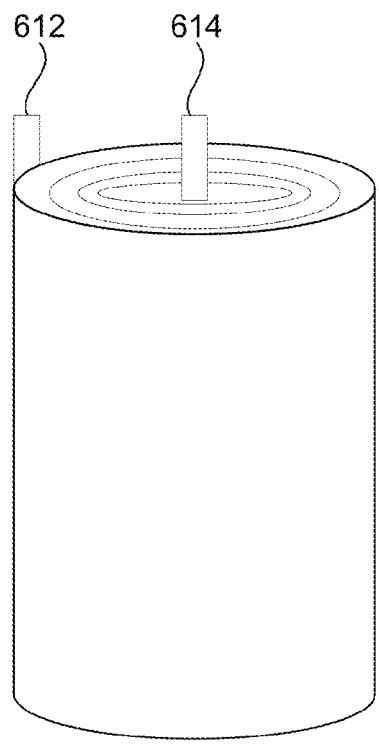

A wound design is a common arrangement. Long and narrow electrodes are wound together with two sheets of separator into a sub-assembly, sometimes referred to as a jellyroll, shaped and sized according to the internal dimensions of a curved, often cylindrical, case. FIG. 6A shows a top view of a jelly roll comprising a positive electrode 606 and a negative electrode 604. The white spaces between the electrodes represent the separator sheets. The jelly roll is inserted into a case 602. In some embodiments, the jellyroll may have a mandrel 608 inserted in the center that establishes an initial winding diameter and prevents the inner winds from occupying the center axial region. The mandrel 608 may be made of conductive material, and, in some embodiments, it may be a part of a cell terminal. FIG. 6B presents a perspective view of the jelly roll with a positive tab 612 and a negative tab 614 extending from the jelly roll. The tabs may be welded to the uncoated portions of the electrode substrates.

The length and width of the electrodes depend on the overall dimensions of the cell and thicknesses of active layers and current collector. For example, a conventional 18650 cell with 18 millimeters in diameter and 65 millimeters in length may have electrodes that are between about 300 and 1000 millimeters long. Shorter electrodes corresponding to low rate/higher capacity applications are thicker and have fewer winds.

A cylindrical design may be desirable for some lithium ion cells because the electrodes swell during cycling and exert pressure on the casing. A round casing may be made sufficiently thin and still maintain sufficient pressure. Prismatic cells may be similarly wound, but their case may bend along the longer sides from the internal pressure. Moreover, the pressure may not be even within different parts of the cells and the corners of the prismatic cell may be left empty. Empty pockets may not be desirable within the lithium ions cells because electrodes tend to be unevenly pushed into these pockets during electrode swelling. Moreover, the electrolyte may aggregate and leave dry areas between the electrodes in the pockets negative effecting lithium ion transport between the electrodes. Nevertheless, for certain applications, such as those dictated by rectangular form factors, prismatic cells are appropriate. In some embodiments, prismatic cells employ stacks rectangular electrodes and separator sheets to avoid some of the difficulties encountered with wound prismatic cells.

Figure 7:
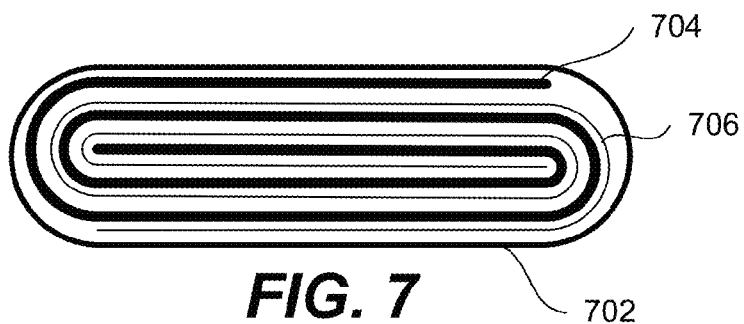
FIG. 7 is a top schematic view of an illustrative prismatic wound cell in accordance with certain embodiments.

FIG. 7 illustrates a top view of a wound prismatic jellyroll. The jelly roll comprises a positive electrode 704 and a negative electrode 706. The white space between the electrodes is representative of the separator sheets. The jelly roll is inserted into a rectangular prismatic case. Unlike cylindrical jellyrolls shown in FIGS. 6A and 6B, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 8A:
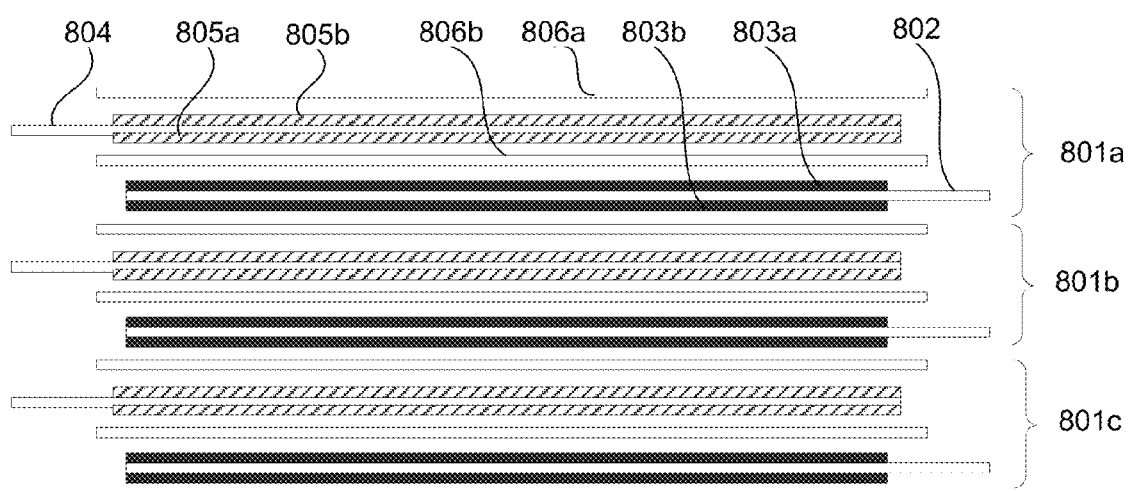
FIGS. 8A-B are a top schematic view and a perspective schematic view of an illustrative stack of electrodes and separator sheets in accordance with certain embodiments.
Figure 8B:
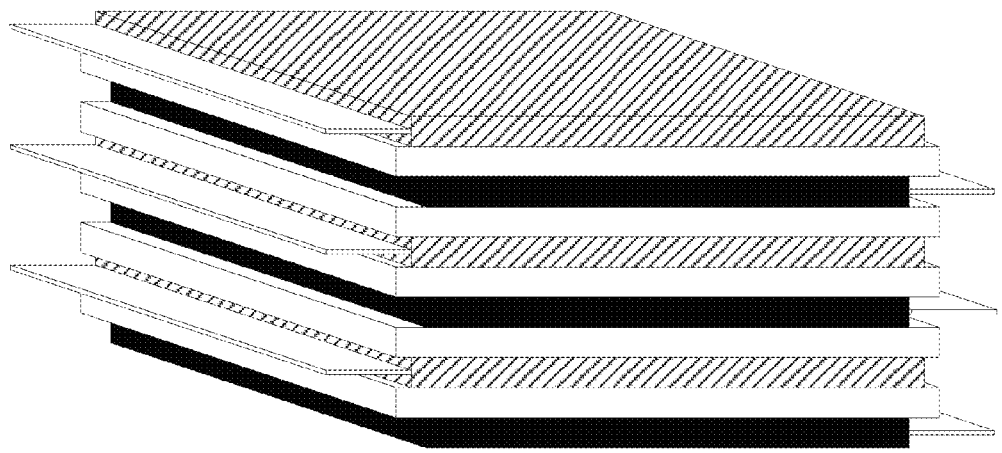

FIG. 8A illustrates a side view of a stacked cell including a plurality of sets (801a, 801b, and 801c) of alternating positive and negative electrodes and a separator in between the electrodes. One advantage of a stacked cell is that its stack can be made to almost any shape, and is particularly suitable for prismatic cells. However, such cell typically requires multiple sets of positive and negative electrodes and a more complicated alignment of the electrodes. The current collector tabs typically extend from each electrode and connected to an overall current collector leading to the cell terminal.

Housing

Figure 9:
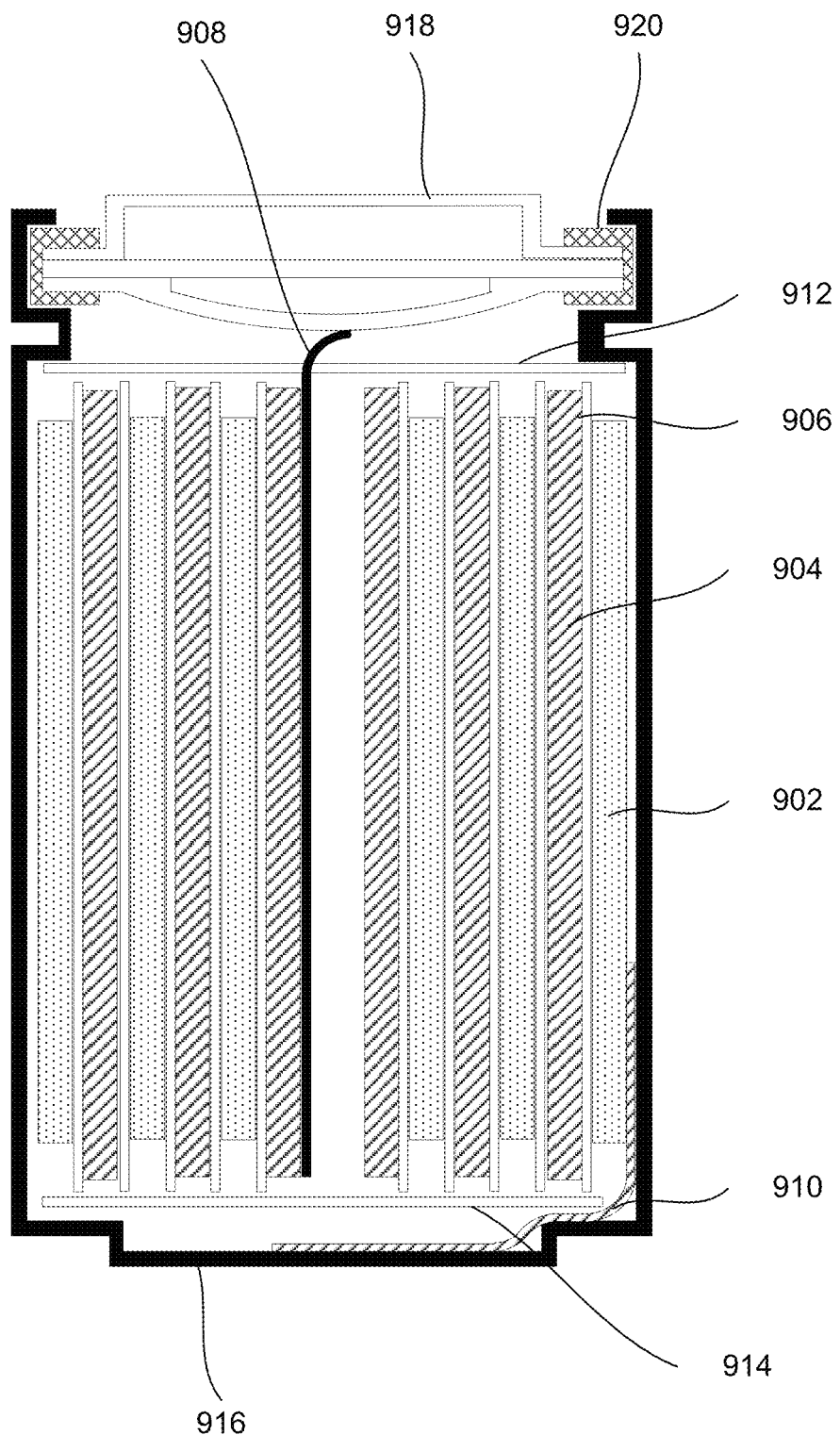
FIG. 9 is a schematic cross-section view of an example of a wound cell in accordance with embodiments.

FIG. 9 illustrates a cross-section view of the wound cylindrical cell in accordance with one embodiment. A jelly roll comprises a spirally wound positive electrode 902, a negative electrode 904, and two sheets of the separator 906. The jelly roll is inserted into a cell case 916, and a cap 918 and gasket 920 are used to seal the cell. In some cases, cap 912 or case 916 includes a safety device. For example, a safety vent or burst valve may be employed to break open if excessive pressure builds up in the battery. Also, a positive thermal coefficient (PTC) device may be incorporated into the conductive pathway of cap 918 to reduce the damage that might result if the cell suffered a short circuit. The external surface of the cap 918 may used as the positive terminal, while the external surface of the cell case 916 may serve as the negative terminal. In an alternative embodiment, the polarity of the battery is reversed and the external surface of the cap 918 is used as the negative terminal, while the external surface of the cell case 916 serves as the positive terminal. Tabs 908 and 910 may be used to establish a connection between the positive and negative electrodes and the corresponding terminals. Appropriate insulating gaskets 914 and 912 may be inserted to prevent the possibility of internal shorting. For example, a Kapton™ film may used for internal insulation. During fabrication, the cap 918 may be crimped to the case 916 in order to seal the cell. However prior to this operation, electrolyte (not shown) is added to fill the porous spaces of the jelly roll.

A rigid case is typically required for lithium ion cells, while lithium polymer cells may be packed into a flexible, foil-type (polymer laminate) case. A variety of materials can be chosen for the case. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

CONCLUSION

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A lithium ion battery electrode for use in a lithium ion battery, the lithium ion battery electrode comprising:
a conductive substrate having open structures and a fractional void volume of at least about 25% such that the conductive substrate includes internal open spaces; and
a nanostructured active material formed on the conductive substrate and in direct electronic communication therewith for inserting and removing lithium ions to and from the nanostructured active material during battery cycling, wherein the nanostructured active material includes one or more nanostructures completely within the internal open spaces of the conductive substrate, and
wherein the nanostructured active material comprises one or more materials selected from the group consisting of silicon, germanium, and tin.

2. The lithium ion battery electrode of claim 1, wherein a type of the conductive substrate is selected from the group consisting of a foam, a mesh, and a perforated sheet.

3. The lithium ion battery electrode of claim 1, wherein the conductive substrate is a perforated sheet having a top surface, a bottom surface, and a plurality of openings having inner surfaces, and wherein the nanostructured active material is deposited on the inner surfaces of the plurality of openings while the top surface and the bottom surface of the perforated sheet are substantially free from the nanostructured active material.

4. The lithium ion battery electrode of claim 3, wherein an average cross-section dimension of the plurality of openings is between about 10 micrometers and 100 micrometers.

5. The lithium ion battery electrode of claim 1, wherein the nanostructured active material comprises nanowires.

6. The lithium ion battery electrode of claim 1, wherein the lithium ion battery electrode is configured to maintain a substantially constant thickness during cycling of the lithium ion battery.

7. The lithium ion battery electrode of claim 1, wherein the conductive substrate comprises randomly oriented open structures.

8. The lithium ion battery electrode of claim 1, wherein the conductive substrate is an open cell foam.

9. The lithium ion battery electrode of claim 1, wherein the conductive substrate has an electronic resistivity of less than about 6.4×10-7 Ohm-cm.

10. The lithium ion battery electrode of claim 1, wherein the nanostructured active material comprises one or more types selected from the group consisting of nanoparticles, nanolayers, and substrate rooted nanostructures.

11. The lithium ion battery electrode of claim 1, wherein the nanostructured active material has a critical dimension of less than about 100 nanometers.

12. The lithium ion battery electrode of claim 1, wherein the electrode has a fractional void volume of at least about 50% prior to the first charge.

13. The lithium ion battery electrode of claim 1, wherein the conductive substrate is configured to transport electrochemically active ions between two opposite surfaces of the electrode.

14. The lithium ion battery electrode of claim 1, wherein the conductive substrate comprises one or more materials selected from the group consisting of copper, stainless steel, nickel, and titanium.

15. The lithium ion battery electrode of claim 1, wherein the conductive substrate has a surface area of at least 50% greater than the corresponding two surfaces of the electrode.

16. The lithium ion battery electrode of claim 1, wherein the nanostructured active material comprises amorphous silicon.

17. A method of manufacturing an electrode for use in a lithium ion battery, the method comprising:
providing a conductive substrate having open structures and a fractional void volume at least about 25% such that the conductive substrate includes internal open spaces; and
depositing a nanostructured active material comprising one or more materials selected from the group consisting of silicon, germanium, and tin on the conductive substrate, wherein depositing the nanostructured active material includes depositing nanostructures within the internal open spaces of the conductive substrate such that the one or more nanostructures are completely within the internal open spaces of the conductive substrate;
wherein the deposited nanostructured active material is configured for inserting and removing lithium ions during battery cycling.

18. The method of claim 17, wherein the deposition comprises a vapor-liquid-solid chemical vapor deposition process to form crystalline silicon nanowires that are substrate rooted on the conductive substrate.

19. The method of claim 17, wherein the deposition comprises introducing a slurry containing the nanostructured active material into the conductive substrate and drying the slurry to form voids inside the electrode.

20. A lithium ion battery comprising:
a conductive substrate having open structures and a fractional void volume of at least about 25% such that the conductive substrate includes internal open spaces; and
nanostructured active material formed on the conductive substrate, wherein one or more nanostructures are completely within the internal open spaces of the conductive substrate, and the nanostructured active material and conductive substrate are in direct electronic communication therewith, for inserting and removing lithium ions during battery cycling,
and wherein the nanostructured active material comprises one or more materials selected from the group consisting of silicon, germanium, and tin.

21. The lithium ion battery electrode of claim 1, wherein the nanostructured active material comprises nanolayers.

22. The lithium ion battery electrode of claim 1, wherein the nanostructured active material comprises substrate rooted nanostructures.

23. The lithium ion battery electrode of claim 1, wherein the nanostructured active material includes nanostructures within the internal open spaces of the conductive substrate.

24. The lithium ion battery electrode of claim 1, wherein the nanostructured active material includes nanostructures attached to internal surfaces of the conductive substrate.

25. The lithium ion battery electrode of claim 1, wherein the electrode is configured such that its thickness remains substantially constant during cycling.

26. The lithium ion battery electrode of claim 1, wherein the conductive substrate is collapsible.

* * * * *